United States Patent [19]

Luff

[11] 3,790,935

[45] Feb. 5, 1974

[54] BUBBLE IN LOW COERCIVITY CHANNEL

[75] Inventor: Peter Purnell Luff, Ottawa, Ontario, Canada

[73] Assignee: Bell Canada-Northern Electric Research Limited, Ottawa, Ontario, Canada

[22] Filed: Mar. 26, 1971

[21] Appl. No.: 128,285

[52] U.S. Cl. 340/174 TF, 340/174 VA, 340/174 ZB
[51] Int. Cl. .......... G11c 11/14
[58] Field of Search .. 340/174 TF, 174 VA, 174 ZB

[56] References Cited

UNITED STATES PATENTS

| | | | |
|---|---|---|---|
| 3,553,661 | 1/1971 | Hadden, Jr. | 340/174 FB |
| 3,715,736 | 2/1973 | O'Donnell et al | 340/174 TF |
| 3,717,853 | 2/1973 | O'Donnell et al | 340/174 TF |
| 3,676,871 | 7/1972 | Copelano | 340/174 TF |
| 3,636,531 | 1/1972 | Copelano | 340/174 TF |
| 3,641,518 | 2/1972 | Copelano | 340/174 TF |
| 3,540,019 | 11/1970 | Bobeck et al. | 340/174 TF |
| 3,503,054 | 3/1970 | Bobeck et al. | 340/174 TF |
| 3,530,444 | 9/1970 | Bobeck et al. | 340/174 TF |

*Primary Examiner*—Vincent P. Canney
*Attorney, Agent, or Firm*—Sidney T. Jelly

[57] ABSTRACT

The surface of a magnetic oxide layer, or platelet, has one or more cavities formed therein. The cavities extend in a predetermined pattern and the bottom of each cavity has a coercivity lower than the coercivity at the surface of the layer. Thus magnetic domains follow the pattern of a cavity. A cavity may be formed with a base surface and at least one intermediate surface which has a coercivity intermediate the bottom or base surface, and the outer surface. The bottom of a cavity can be given a stepped formation to provide positive domain locations along a cavity.

3 Claims, 8 Drawing Figures

BUBBLE IN LOW COERCIVITY CHANNEL

This invention relates to magentic single wall domain devices, and particularly to the control of the propagation of such domains, and to the control of the movement of such domains.

Magnetic domain propagation in magentic oxide layers, and platelets, has been considered as a means for recording information, which information can readily be retrieved, for example memory devices and logic devices. The magnetic domains are cylindrical in form, bounded by a single domain wall and generally referred to as "bubbles." A domain is a localized highly stable magnetic state with an axis of the cylinder normal to the surface of the layer.

Domains are capable of being moved about, by a suitable magnetic field or force. It is desirable, and in many cases essential, that domains should move along predetermined paths. In many instances it is at least desirable and again often essential, that domains should locate at predetermined positions when not moving.

As is well known, domain propagation, and movement, has been carried out by means of "T" and "I" bar shaped patterns. Usually the patterns are etched into a magnetic thin film overlay positioned on the oxide layer, but separated therefrom by a suitable medium. Other forms of patterns have been used, for example in the form of rail tracks which form guide channels. There are certain disadvantages in the use of the overlay; in particular the oxide layer needs to be processed so that the whole of its surface area is of sufficiently low coercivity to allow domain propagation; the magnetic film has to be applied to the oxide layer — with a separating medium introduced to ensure the film does not come into direct contact with the surface of the layer; the magnetic film is usually not transparent — a possible disadvantage if optical readout detectors are to be used.

It is not easy to process the whole surface of the oxide layer to obtain the low coercivity required; odd defects often still remain, even after the most careful processing. The application of the magentic film is usually evaporation directly on to the oxide layer — over a separating medium, or by evaporation on to a separate glass substrate which is positioned on the oxide layer, a photo-resist layer, or similar layer, provides the required separation of oxide layer and magnetic film. These latter processes are inconvenient, and in any case result in the aforementioned non-transparent film.

The present invention provides for the production of magnetic domain devices having a predetermined pattern formed in the surface of a magnetic oxie layer, or platelet, the pattern in the form of at least one cavity formed in the oxide layer, the cavity having a lower coercivity at its bottom than at the surface of the layer, or platelet.

Thus, in accordance with one feature of the invention there is provided a magnetic domain device comprising a layer of magnetic oxide material, the layer having an outer surface; and at least one cavity formed in the layer from the outer surface, the base of the cavity having a coercivity lower than the coercivity of the outer surface. The cavity may form a predetermined pattern extending over part, or all, of the outer surface. More than one cavity may be formed. A cavity may be formed with intermediate steps, for example a cavity may have a base level and one or more intermediate levels. The coercivity at an intermediate level is higher than that at the base but lower than that at the outer surface.

In accordance with another feature of the invention there is provided a process of making a magnetic domain device comprising the step of ion milling at least one cavity in a layer, or platelet, of magnetic oxide material whereby the coercivity at the base of the cavity is lower than the coercivity at the surface of the layer, or platelet.

The invention will be readily understood by the following description of certain embodiments, by way of example, in conjunction with the accompanying drawings, in which:-

Figure 1:
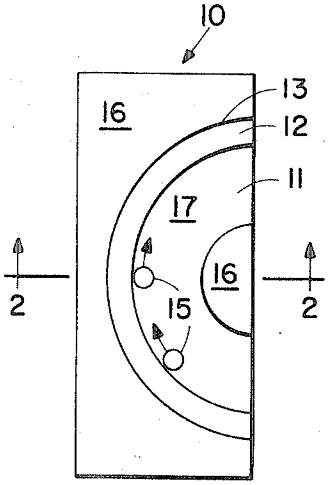
FIG. 1 is a plan view of a platelet of magnetic oxide, with a curved channel formed in one surface.

FIG. 1 illustrates a platelet 10 of a magnetic oxide, the surfaces having a channel 11 formed therein -only one surface being shown in FIG. 1. Channel 11 has a step 12 adjacent the radially outward edge 13. This is seen more clearly in FIG. 2.

Figure 2:
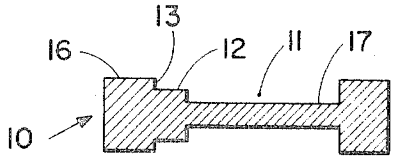
FIG. 2 is a cross-section on the line 2—2 of FIG. 1.
Figure 3:
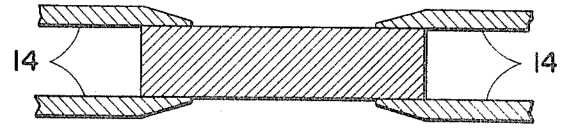
FIGS. 3 and 4 illustrate steps in the production of the cross-section of FIG. 2.
Figures 4, 5:
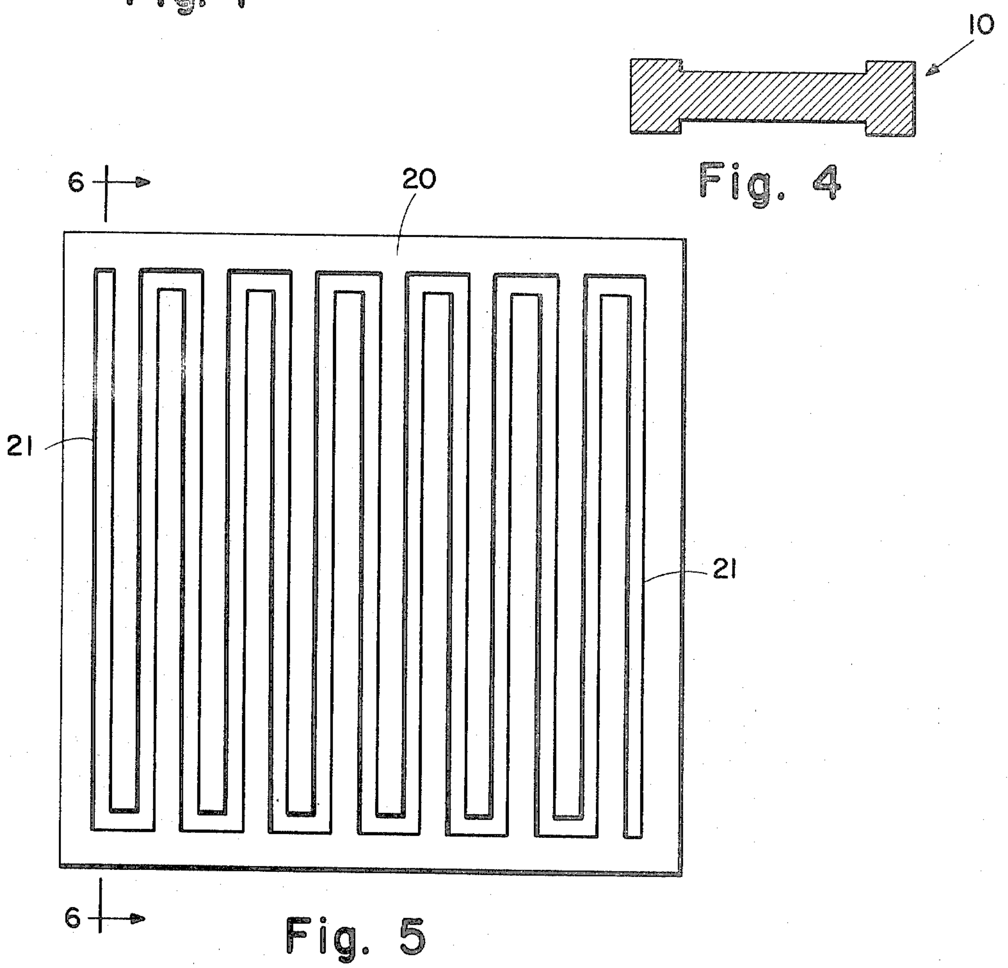
FIG. 5 is a plan view of a domain device having a cavity forming a predetermined pattern on one surface.

The channel 11 is formed by ion-milling. The mechanically polished platelet 10 is mounted in a stainless-steel holder 14, as seen in FIG. 3, and the holder and platelet placed in an ion milling machine. A step or channel is cut into both surfaces of the platelet 10. The cross-section is then as shown in FIG. 4. The platelet 10 is repositioned in the holder, the holder and platelet replaced in the machine and further milled to reproduce the cross-section as seen in FIG. 2. Magnetic domains, or bubbles, were propagated, as indicated at 15. The bubbles were moved under the action of a magnetic probe and found to follow the circular channel.

Propagation can be carried out with coercivities <0.5 oe but to produce satisfactory domain, or bubble, propagation the coercivity should be reduced below 0.1 oe. This is done by removing the damaged surface layer -produced by mechanical polishing- by ion milling. In the particular example shown, the coercivity was reduced from 1.0 oe at the surface 16 of the platelet 10 to 0.1 oe at the bottom surface 17 of the channel, for a particular material. The domains or bubbles which would normally be free to move anywhere on a flat surface were constrained to move along the channel 11 in contact with the step 12.

The cavity formed in the oxide layer, or platelet, can take a variety of forms. One such form is illustrated in FIG. 5. A platelet 20 has a continuous channel or groove 21 formed in one surface, the channel extruding backwards and forwards across the platelet. The cavity can also take other forms, for example a spiral, or a series of separate cavities can be formed and each cavity can be in a predetermined pattern.

Devices in accordance with the invention can be used in various ways. For example, it may be required that the domains move along a channel in a step-by-step manner, or they move in a free manner. Thus, in the latter example, a domain may move freely along a channel, its position at any instance indicative of a particular parameter, or value or some other circumstance.

Where it is desired that the domains move in a step-by-step manner, it is necessary to provide some means whereby magnetic conditions are created which divide the path followed by a domain into sections, or which set up a predetermined pattern of positions at which a domain will settle. For example, in the previously referred system using "T" and "I" bar patterns, domains stabilize at the ends of the cross-bar and stem of the "T" and at the ends of the "I."

Figure 6:
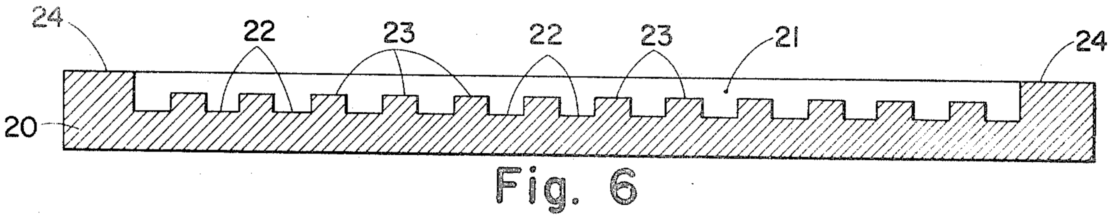
FIG. 6 is a cross-section on the line 6—6 of FIG. 5, to a larger scale; illustrating a modification.

This step-by-step movement can be provided, in the present invention by producing discrete locations having a coercivity lower than the spaces between the locations. FIG. 6 illustrates one way of obtaining such an arrangement. FIG. 6 is a cross-section along a channel, for example as on the line 6—6 of FIG. 5. The channel 21 has a stepped configuration, having a base or bottom surface 22, a series of intermediate surfaces 23, and the outer surface, of the platelet 20, at 24. A plan view of the arrangement of FIG. 6 is shown in FIG. 7.

Figure 7:
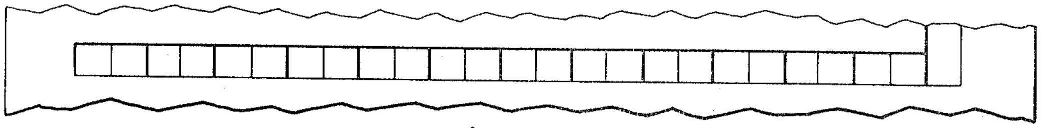
FIG. 7 is a plan view of the arrangement of FIG. 6.

The coercivity of the bottom surface 22 is lower than the coercivity of the intermediate surfaces 23. In turn the coercivity of the intermediate surfaces 23 is lower than that of the outer surface 24. Typical values, by way of example only, are 1.0 oe for surface 24, 0.3 oe for surfaces 23 and 0.1 oe for surface 22. As a result, a domain will move along the channel 21 in a predetermined manner. Thus if the magnetic field, or bias, moving the domain is of a sufficiently high value, the domain will move along the channel with little or no stopping at individual locations. If the magnetic field is removed, then the domain will stabilize at a position on the lower surface 22, between two intermediate surfaces 23. If the magnetic field is pulsed, a domain will move or "jump," from one position between two surfaces 23 to the next adjacent position. A domain will not remain stationary at a position of an intermediate surface 23.

Where a plurality of cavities is formed in a platelet, or layer, each cavity having a predetermined pattern, then each cavity can have a stepped form as in FIGS. 6 and 7. It is possible to connect adjacent cavities by grooves or channels, the bottom surfaces of which can be any desired level. For example the bottom surface of such a groove can be intermediate the levels of the surfaces 23 and surface 24, thus having a coercivity intermediate the values for surfaces 23 and 24, and thus requiring a magnetic field, or bias, having a higher value than that which moves the domain along the channel to move the domain from one cavity to another.

The invention avoids the use of a magnetic film overlay and devices are thus easier to make, as registration difficulties are avoided. Also optical read-out can be used. Coercivity need only be reduced along the track or channel, thus simplifying platelet, or layer processing procedure. With an overlay the entire surface of the platelet, or layer, must be treated to reduce coercivity over the whole area.

The stepped formation can be obtained by ion-milling, in various ways. For example, the cavity can be first milled to a uniform depth — to the level of surfaces 23 in FIG. 6, and then masking applied. Further milling will deepen the cavity to the lower surface level 22. Alternatively an electron or ion beam machine can be used which will mill deeper at predetermined positions, for example by modulation of the beam intensity. Such machines can be controlled by a computer. It is also possible to vary the width of a channel or groove to provide a similar "stepped" formation. A domain will normally stabilize at the wider portion of a channel when the drive stimulus is removed.

Figure 8:
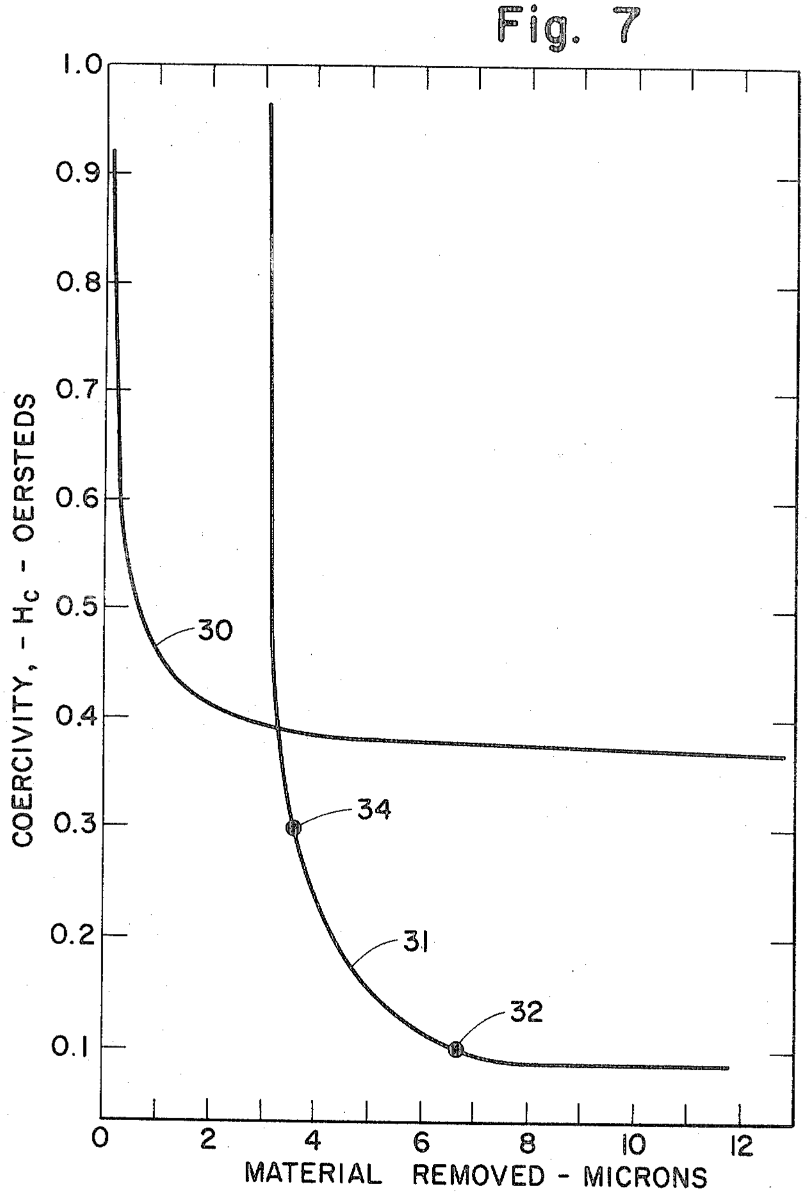
FIG. 8 shows two curves of coercivity plotted against material removed.

The differential in coercivity can be obtained by the removal of a predetermined amount of material. FIG. 8 illustrates curves showing the reduction in coercivity obtained with removal of material. While different materials will have different curves, the actual shape of each curve will be similar. Curve 30 is typical for $YbF_eO_3$; while curve 31 is typical for $Sm_{0.55}Tb_{0.45}F_eO_3$. $Sm_{0.55}Tb_{0.45}F_eO_3$ is a particularly useful material as very small bubbles or domains are formed in this material —thus enabling a very large number of domains to be provided in a given area— for example up to $10^5/in^2$.

As seen in curve 30, the surface of a layer, or platelet, after polishing has a coercivity of approximately 1.0 oe. Removal of material at first rapidly reduces the coercivity, and then causes a slower decrease in coercivity until a minimum value is reached. As will be seen from curve 31, the initial high coercivity remains for some initial material removal, and then reduction occurs —reaching a minimum value rather lower than in curve 30. It is envisaged that with improved polishing techniques, the upper part of curve 31 can be caused to assume values very similar to that of curve 30, i.e., that fast reduction of coercivity will occur immediately material removal commences.

In application of the invention, material removal will normally by such that the coercivity of the various levels or surfaces will be at predetermined positions on the curve relating to the particular material. Thus for curve 31, the bottom surface, surface 22 in FIG. 6, will correspond to position 32 on the curve, approx. 0.1 oe, and intermediate surfaces -surfaces 23 in FIG. 6, will correspond to position 34 on the curve, approx. 0.3 oe. If more than one intermediate level, or surface is required, suitable positions on the curve are selected, to give the desired coercivity values, and the amount of material removal will be indicated.

What is claimed is:

1. A magnetic single wall domain device comprising: a layer of mangetic oxide material having an outer surface; and a channel formation in said layer extending from said outer surface and having a base surface; said base surface having a magnetic coercivity less than 0.5 oe, said outer surface having a magnetic coercivity of approximately 1.0 oe, magnetic domains developed and propagated at said base surface of said channel.

2. A device as claimed in claim 1, the channel of stepped formation whereby the base surface is divided into separate sections by spaced apart intermediate surfaces at a level between the base surface and the outer surface, the intermediate surfaces having a coercivity value intermediate the values for the base and outer surfaces.

3. A device as claimed in claim 1, the width of the channel reduced at predetermined spaced apart positions along the channel.

* * * * *